Dec. 19, 1967  D. W. BARGEN  3,358,511
COMPUTING TRANSDUCER SYSTEM
Filed Oct. 5, 1965  3 Sheets-Sheet 1

INVENTOR:

DAVID W. BARGEN

ATTORNEY:
WILLIAM A. KEMMEL JR.

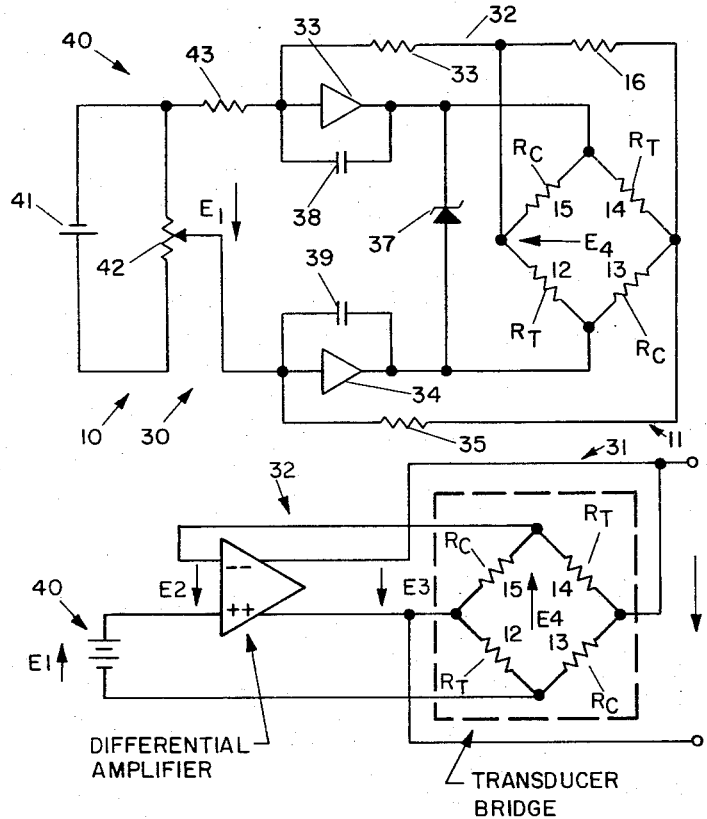
FIG. 3
FIG. 4
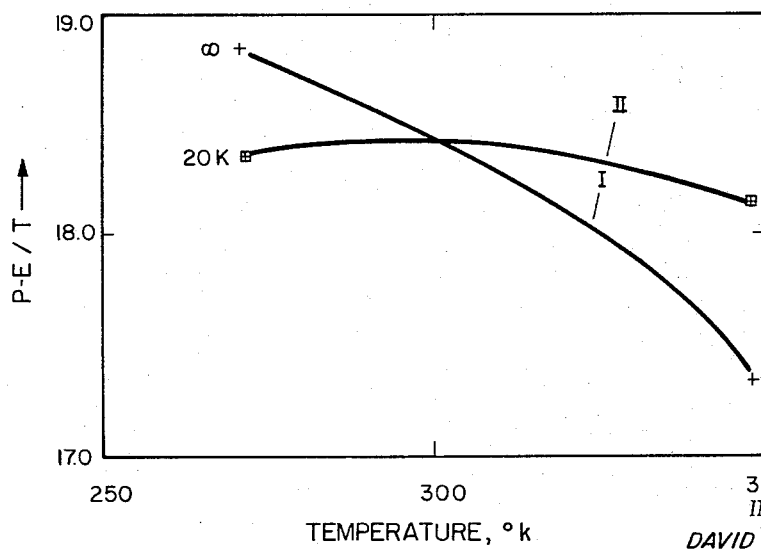
FIG. 5
INVENTOR:
DAVID W. BARGEN
ATTORNEY:
WILLIAM A. KEMMEL JR.

Dec. 19, 1967  D. W. BARGEN  3,358,511
COMPUTING TRANSDUCER SYSTEM
Filed Oct. 5, 1965  3 Sheets-Sheet 3

INVENTOR:
DAVID W. BARGEN

ATTORNEY:
WILLIAM A. KEMMEL JR.

United States Patent Office 3,358,511
Patented Dec. 19, 1967

3,358,511
COMPUTING TRANSDUCER SYSTEM
David W. Bargen, Pasadena, Calif., assignor to Electro-Optical Systems, Inc., Pasadena, Calif., a corporation of California
Filed Oct. 5, 1965, Ser. No. 493,049
6 Claims. (Cl. 73—398)

In general, the present invention relates to a device and method for accurately and directly measuring the inverse of a selected variable. Also, the present invention relates to a device and method which are adapted to provide voltage which are accurately and directly proportional to the ratio of only a selected positive power of absolute temperature to a selected variable. In particular, the present invention relates to a transducer adapted to provide an output voltage which is directly proportional to the inverse of selected variables such as pressure, force, acceleration, and torque. As set forth in the concurrently filed patent application of Joseph C. Sanchez and David W. Bargen, entitled "Measuring and Computing Device and Method," Ser. No. 493,085, filed Oct. 5, 1965, assigned to applicant's assignee and whose disclosure is hereby incorporated as a reference, the piezoresistance effect in bodies of semiconductor material permits the use of such bodies in transducers such as pressure transducers. Conventionally, such pressure transducers provide a voltage output which is directly proportional only to the pressure being measured with proper temperature compensation, i.e., the temperature effect on the various portions of the transducer is compensated out by known techniques. However, there are many applications wherein the reciprocal or inverse of a selected variable is desired rather than the value itself. For example, in the case of pressure, the inverse of pressure appears in many equations for the measurement of gas volume. Conventionally, when the inverse of the measured variable is desired the voltage output of a conventional transducer is simply fed to a suitable computing circuit whose output provides the desired quantity. However, such computing circuits are generally complicated systems which because of their number of parts and their complexity are relatively expensive and have significant problems with respect to reliability. In addition, it's frequently desired to know the ratio of a selected positive power of absolute temperature, such as the first power, to a selected variable. For example, the ratio of absolute temperature to pressure appears in the equations for measuring gas volume.

Consequently, an object of the present invention is a transducer which is adapted to measure directly the inverse of a selected variable such as pressure.

Another object of the present invention is a transducer which is adapted to measure directly the ratio of only a selected positive power of absolute temperature to a selected variable such as pressure.

Still another object of the present invention is a transducer which is adapted to measure directly the volume of a given mass of gas.

Still another object of the present invention is a method of obtaining simply the inverse of a selected variable or the ratio of a positive power of temperature to a selected variable.

Other objects and advantages of the present invention would be readily apparent from the following description and drawings which illustrate a preferred exemplary embodiment of the present invention.

In general, the present invention is a method and transducer adapted to provide a voltage which is accurately and inversely proportional to a selected variable. The transducer includes a first component comprising at least two strain gage bodies with the first of said body being subjected to a first strain corresponding to the value of the selected variable being measured and the second of said bodies being subjected to a second substantially different strain corresponding to the value of selected variable being measured. A second component of the transducer is a carrier structure supporting said bodies and adapted to translate the effect of the selected variable into strain on said body. Finally, a third component is an electrical circuit including a bridge circuit having each of said bodies connected in a leg of said circuit and a high gain differential amplifier whose output is connected to the input of the bridge circuit and whose input is connected to the output of the bridge circuit so that a large negative feedback is achieved.

Also, the present invention involves a transducer adapted to provide a voltage which is accurately and directly proportional to the ratio of only a selected positive power of absolute temperature to a selected variable. Such transducer includes a first component comprising at least two bodies of semiconductor material with the first of said bodies being subjected to a first strain corresponding to the value of the selected variable being measured and being subjected to the temperature being measured. The second of said bodies is subjected to a second substantially different strain corresponding to the value of a selected variable being measured and is also subjected to the temperature being measured. The second component of the transducer is a carrier structure supporting such body and adapted to translate the effect of said selected variable into strain on said body. Finally, a third component is an electrical circuit including a bridge circuit having each of said bodies connected in a leg of said circuit and a high gain differential amplifier whose output is connected to the input of said bridge circuit and whose input is connected to the output of said bridge circuit so that a large negative feedback is achieved. The transducer is adapted to provide a voltage which is directly proportional to the ratio of a function of absolute temperature to a selected variable without temperature compensation. In addition, at least one of the components is adapted to compensate for said function so that said voltage output is proportional to the ratio of only a selected positive power of absolute temperature to said selected variable. As used in the present invention the term "function of absolute temperature" refers to a function such as the linear function in $a+bt$ where $a$ and $b$ are constants not equal to zero and $t$ is absolute temperature, i.e., having additional terms such as $ct^2$ and $dt^3$. Such "function of absolute temperature" results from the usual processing of bodies of semiconductor material and structure of the transducer and, as noted, it was previously simply compensated to substantially a constant, unity. On the other hand, the term "only a selected positive power of absolute temperature" refers to the simple quantity $T^n$ where $n$ is a selected positive number. Particularly, $n$ is in the range of about greater than or equal to 0.1 or less than or equal to 2. Thus, the temperature function is changed from an unusable complex random function to a highly useful, simple, selected function. It should be noted that both the above mathematical quantities are only accurate approximations of the actual temperature relationship since it is too complex to be defined precisely in practical devices.

In order to facilitate understanding of the present invention, reference will now be made to the appended drawings of specific embodiments of the present invention. Such drawings should not be construed as limiting the invention which is properly set forth in the appended claims.

In the drawings:

FIGURE 3 is the simplified circuit diagram of a pressure transducer incorporating the present invention.

FIGURE 4 is a schematic circuit diagram equivalent to the FIG. 1 illustrating the operation of the present invention.

FIGURE 5 is a graph of the output of the transducer illustrated in FIGS. 1–3 with and without temperature compensation.

FIGURE 6 is a schematic illustration of a specific application of the present invention.

FIGURE 7 is a schematic circuit diagram for the transducer utilized in FIG. 6.

Figure 1:
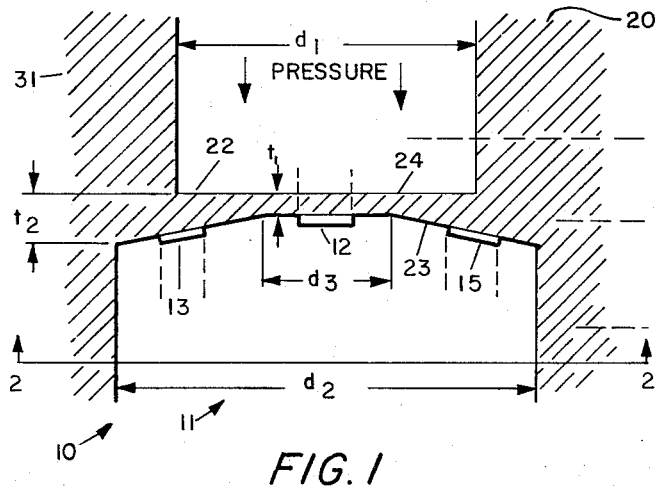
FIGURE 1 is an axial cross section of a portion of a preferred specific embodiment of the transducer of the present invention.
Figure 2:
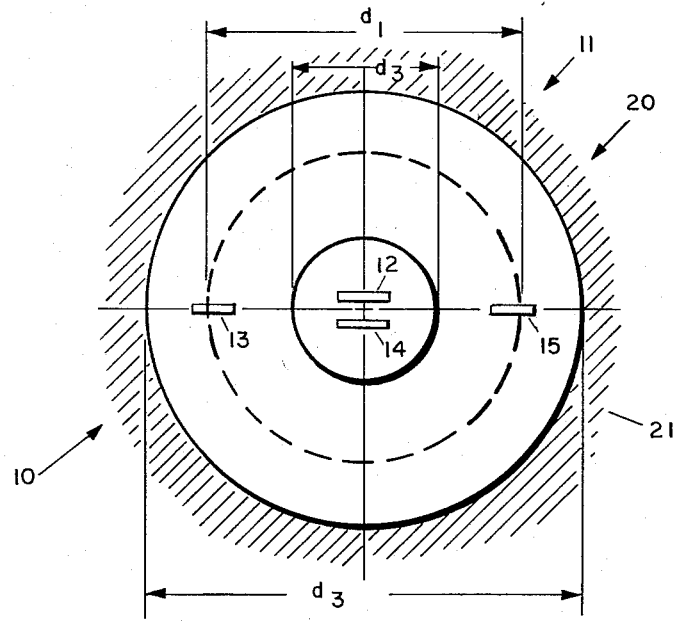
FIGURE 2 is a cross-sectional view of FIG. 1 taken along the line 2—2 of FIG. 1.

As illustrated in FIGS. 1–3, a specific embodiment of the present invention, is a pressure transducer 10 which is adapted to provide a voltage which is accurately and directly proportional to the ratio of the first power of absolute temperature to pressure. The first or sensing component 11 of the transducer 10 includes four bodies, 12, 13, 14 and 15 of semiconductor material. Two of said bodies, 12 and 14, are subjected to tension strain corresponding to the pressure being measured and are also subjected to the temperature being measured. The other two of said bodies, 13 and 15 are subjected to compression strain corresponding to pressure being measured and also are subjected to the temperature being measured. All of the bodies 12, 13, 14 and 15 are formed and used in the transducer 10 as set forth in the aforementioned Sanchez et al. patent application. Supporting the bodies 12, 13, 14 and 15 is a carrier structure 20 which is adapted to translate the effect pressure into strain on the bodies 12, 13, 14 and 15. As illustrated in FIGS. 1 and 2, the carrier structure 20 includes a housing 21 having a tapered diaphragm 22 integral therewith which forms a clamped edge diaphragm. Bodies 12, 13, 14 and 15 are mounted on the inner surface 23 of a diaphragm 22 while the pressure to be measured contacts the outer surface 24 of the diaphragm 22. A detailed description of the construction and operation of the carrier structure 20 is set forth in a copending application of William H. McLellan, entitled, "Improved Pressure Transducer," Ser. No. 424,551, filed Jan. 11, 1965, assigned to applicant's assignee and such disclosure is hereby incorporated for reference.

The first component 11 is incorporated into an electrical circuit 30 which is illustrated in FIG. 3 in simplified circuit form and illustrated schematically in equivalent form in FIG. 4. As shown, the electrical circuit 30 includes a bridge circuit 31 with each of the bodies 12, 13, 14, and 15 of semiconductor material forming one of its legs. The relationship between the output voltage $E_4$ and the input voltage $E_3$ of the circuit illustrated in FIG. 4 is set forth approximately in the following equation when the shunt resistance 16 is disconnected:

$$\frac{E_4}{E_3} = \frac{R_t - R_c}{R_t + R_c} \quad (1)$$

In such equation, all of the strain gages are assumed to have substantially equal resistance and the shunt resistance 16 is infinite. Analysis of the above equation shows that the difference between $R_c$ and $R_t$ is a function of pressure while the sum of $R_t$ and $R_c$ is a function of temperature. Also, there are a variety of electrical circuits equivalent to the bridge circuit illustrated in FIGS. 3 and 4 wherein the input voltage is related to the output voltage by the ratio of the difference between $R_c$ and $R_t$ to the sum of $R_c$ and $R_t$. Consequently, as used in the present application, the term "bridge circuit" refers to any electrical circuit wherein the ratio of the output voltage to input voltage is the function of the ratio of the difference of two resistances to the sum of those resistances.

Connected to the input of the bridge circuit 31 is the output of a high gain differential amplifier 32 whose input is connected to the output of the bridge circuit 31 so that a large negative feedback is achieved. The differential amplifier 32 includes a first single ended amplifier 33 and the second single ended amplifier 34 connected as illustrated in FIG. 3. Although any suitable set of high gain amplifiers may be utilized, the specific amplifiers used to obtain the data set forth in FIG. 5 when using the circuit of FIG. 3 were Embree Amplifiers Model 1503 produced by the Embree Electronics Corp., West Hartford, Conn., which have a gain of about seventy million. Between the output of the electrical bridge circuit 31 and the input of the amplifiers 33 and 34 are resistances 35 and 36 which in conjunction with resistance 43 provide the proper relationship with the reference voltage. Across the output of the amplifiers 33 and 34 is a Zener diode 37 which is adapted to protect the bridge circuit 31 from an excessive voltage difference when the circuit is initially turned on. In parallel with each of the amplifiers 33 and 34 are capacitors 38 and 39 for high frequency roll off. For data set forth in FIG. 5, the specific values of the above circuit components in FIG. 3 are as follows: resistances 35 and 36, each 1 megohm; Zener diode 37, 8 volts; and capacitors 38 and 39, each 1000 picofarads. Connected between the output of the bridge 31 and the input of the amplifier 32 is a reference voltage 40 whose function is set forth below. The voltage source 40 comprises a battery 41 connected across a potentiometer 42 so that a selected voltage may be produced. Such voltage is applied to the differential amplifier through a resistance 43 so that the bridge circuit has the proper output impedance. When obtaining the data set forth in FIG. 5, the battery had a voltage of 1.5 volts, the potentiometer had a maximum resistance of 5 kilohms and the supply resistance had a resistance of 10 megohms.

With reference to the bridge circuit 31, as set forth in the aforementioned Sanchez et al. patent application, without temperature compensation, a voltage is provided which is directly proportional to the ratio of a function of absolute temperature to pressure (curve I, FIG. 5). However, at least one of the transducer components is adapted to compensate for said temperature function so that the voltage is proportional to the ratio of only a selected positive power of absolute temperature to pressure, specifically to the positive power of 1 (curve II, FIG. 5). In the circuit illustrated in FIG. 3, such temperature compensation is achieved by the shunt resistance 16 which was found experimentally to have a value of 20,000 ohms to obtain curve II, FIG. 5.

The operation of the transducer 10 can be readily understood with reference to the structure described above in connection with FIGS. 1–4 and particularly FIG. 4. Specifically, after suitable calibration, a reference voltage is fed to the transducer by the voltage source 40. Concurrently, the diaphragm 22 is exposed to the temperature and pressure being measured. Since the reference pressure on the inner surface 23 of the diaphragm 22 is substantially zero, the pressure being measured causes the diaphragm to deflect inwardly. Such deflection places the central strain gages 13 and 15 under compression to produce corresponding changes in the resistance of each arm of the bridge circuit. Concurrently, the strain gages 12, 13, 14, and 15 are subjected to the temperature of the gas being measured since the thin metal diaphragm comes rapidly to temperature equilibrium with the gas and the strain gages are mounted on the diaphragm. Also, the shunt resistance 16 performs its function as set forth above so that the temperature effect is correspondingly corrected. The resulting overall change in the bridge resistance produces a voltage output from the bracer which is proportional to the ratio of pressure to the first power of absolute temperature. Such relation is set forth in the following equation:

$$e_4 = K_1 \times e_3 \times \text{the ratio of } p/t$$

$$E_4 = K_1 E_3 P/T \qquad (2)$$

where $E_4$ is the brige circuit output voltage,
$K_1$ is a constant,
$E_3$ is the bridge circuit input voltage,
$p$ is absolute pressure, and
$T$ is absolute temperature.

If the voltages are then summed around the loop shown in FIG. 4, including the output of the bridge circuit and the input of the differential amplifier, then the following equation is obtained:

$$E_4 = E_2 - E_1 = 0 \qquad (3)$$

where $E_2$ is the amplifier input voltage and $E_1$ is the reference voltage from the voltage source. However, since the gain of the amplifier is high, it is very nearly true that $E_2$ is zero. Thus, the following relationship is true by combining Equations 2 and 3;

$$E_4 = E_1 = K_1 E_3 P/T \qquad (4)$$

If such equation is solved then for $E_3$, then the amplifier output voltage or the bridge circuit input voltage, the following equation is obtained $$E_3 = \frac{E_1}{K_1} T/P \qquad (5)$$

In short, the output of the transducer 10 becomes directly proportional to the ratio of absolute temperature to pressure. As set forth in the aforementioned Sanchez et al. patent application, the proper value shunt resistance 16 as well as the validity of the foregoing analysis was experimentally determined as shown in FIG. 5 with the proper shunt resistance temperature compensation, the overall error in the voltage output for the transducer 10 was about 1.5% for the temperature range tested.

A specific application of the foregoing transducer is illustrated in FIGS. 6 and 7. As shown in FIG. 6, a tank 50 is filled with a given mass of gas in one portion 51 and a given quantity of liquid in a second portion 52 with the two portions being separated by an elastic bladder 53. Connected to the portion 51 is the transducer 60 which is schematically illustrated in FIG. 7. As shown in FIG. 7, the transducer 60 is supplied with a 28 volt D.C. unregulated input which passes through a preregulator 61 and a D.C./A.C. inverter 62 to a suitable transformer 63. Across the transformer 63 is a first rectifier and filter 64 which provides a power supply for the amplifiers, a second rectifier and filter 65 which provides a reference voltage, i.e., performs the function of the voltage source 40 in FIG. 4, and a third rectifier filter 66 which provides the voltage output $E_0$ as shown. If it is assumed that the gas in the portion 51 of the tank 50 obeys the ideal gas law, the volume of gas is given by the following equation.

$$V_g = WRT/P \qquad (6)$$

where $V_g$ is the gas volume,
$W$ is the mass of gas,
$R$ is the specific gas constant,
$P$ is the absolute pressure, and
$T$ is the absolute temperature.

From a comparison of Equation 6 and Equation 5, it is apparent that the transducer voltage $E_3$ gives a measurement of the gas volume and the voltage $E_1$ can be varied to compensate for the various masses of gas which may be used to pressurize the tank. Furthermore, the volume of water in the tank is given by the following equation:

$$V_w = V_0 - V_g = V_0 - WR/TP \qquad (7)$$

where $V_w$ = the volume of water in the tank,
$V_0$ = the total volume of the tank.

Also, from an inspection of the schematic diagram of FIG. 7 it can be seen that:

$$E_5 = E_0 - E_3 \qquad (8)$$

where $E_5$ is the transducer output voltage. From a comparison of Equations 7 and 8, it can be seen that $E_5$ is a direct measurement of the liquid in the tank 50 when the total volume of the tank is represented by $E_0$ and determined by proper calibration.

Many other specific embodiments of the present invention would be obvious to one skilled in the art in view of this disclosure. For example, although the described specific embodiment of the present invention utilized a Wheatstone bridge structure with four active arms, many other electrical bridge circuits may be utilized including bridge circuits having only two active arms. Also, although the described specific structure utilizes a constant voltage source, it will be readily understood that a constant current power source with the appropriate shunt resistance will produce the same electrical voltage output and thus is equivalent to the constant voltage source. Similarly, in the described specific structure, the strain gages were mounted on a clamped edge diaphragm. Other carrier structures may be utilized such as a deflection beam driven by a post mounted on a clamped edge diaphragm or any other arrangement whereby the variable being measured is translated into strain on the semiconductor strain gage. Furthermore, although specific examples of temperature compensation have been set forth above, it is apparent that other methods of temperature compensation may be utilized to achieve the results of the present invention. See, for example, the temperature sensitivity compensation techniques set forth in the paper entitled, "Recent Developments in Flexible Strain Gages" by J. C. Sanchez and W. V. Wright, given at the Instrument Society of America Conference, Jan. 17, 1961, preprint paper No. 37–SL–61–1. Also, it should be noted that the present invention may be used not only to measure the inverse of pressure as well as ratio of absolute temperature to pressure but also the inverse of any ratio of absolute temperature to such variable which can be measured by strain on semiconductor strain gages. Some examples of such other variables are force, acceleration, and torque.

There are many features in the present invention which clearly show the significant advance the present invention represents over the prior art. Consequently, only a few of the more outstanding features will be pointed out to illustrate the unexpected and unusual results obtained by the present invention. As set forth in the initial portion of the present application, the conventional transducer provides a voltage which has a known relationship to the variable being measured. If it is desired to get the inverse of such variable, then it is necessary to resort to a relatively complex computing circuit. However, with the present invention of the inverse of the selected variable is obtained by relatively simple circuit wherein a single differential amplifier is connected to a bridge circuit. Another feature of the present invention is the utilization of such inversion in conjunction with the output of a semiconductor bridge circuit wherein the ratio of absolute temperature to pressure is obtained directly to provide a simple measurement of quantity such as gas volume where the mass of gas is known.

It will be understood that the foregoing description and examples are only illustrative of the present invention and it is not intended that the invention be limited thereto. All substitutions, alterations, and modifications of the present invention which come within the scope of the following claims or to which the present invention is susceptible

I claim:

1. A transducer adapted to provide a voltage which is accurately and inversely proportional to a selected variable comprising the following components:
    (a) at least two strain gage bodies, (I) the first of said bodies being subjected to a first strain corresponding to the value of the selected variable being measured, and (II) the second of said bodies being subjected to a second substantially different strain corresponding to the value of a selected variable being measured;
    (b) a carrier structure supporting said bodies and adapted to translate the effect of said selected variable into strain on said bodies; and
    (c) an electrical circuit including a bridge circuit having each of said bodies connected in a leg of said circuit and a high gain differential amplifier whose output is connected to the input of said bridge circuit and whose input is connected to the output of said bridge circuit so that a large negative feedback is achieved.

2. A transducer as stated in claim 1 wherein said strain gage bodies are semiconductor bodies.

3. Method of measuring accurately and directly the inverse of a selected variable comprising:
    (a) forming a first component comprising at least two strain gage bodies and supporting said first component on a second component comprising a carrier structure adapted to subject the first of said bodies to a first strain corresponding to the value of selected variable being measured and to subject the second of said bodies to a second substantially different strain corresponding to the value of said selected variable being measured;
    (b) forming a third component comprising an electrical bridge circuit having each of said strain gage bodies connected in a leg of said circuit and a high gain differential amplifier whose output is connected to the input of said bridge circuit and whose input is connected to the output of said bridge circuit so that a large negative feedback is achieved;
    (c) subjecting said components to the selected variable being measured;
    (d) supplying a predetermined voltage to said bridge circuit;
    (e) measuring the voltage output of said bridge circuit.

4. A transducer adapted to provide a voltage which is accurately and directly proportional to the ratio of only a selected positive power of absolute temperature to a selected variable comprising the following components:
    (a) at least two bodies of semiconductor material, (I) the first of said bodies to be subjected to a first strain corresponding to the value of the selected variable being measured and being subjected to the temperature being measured, and (II) the second of said bodies being subjected to a second substantially different strain corresponding to the value of the selected variable being measured and being subjected to the temperature being measured;
    (b) a carrier structure supporting said bodies and adapted to translate the effect of said selected variable into strain on said bodies; and
    (c) an electrical circuit including a bridge circuit having each of said bodies connected in a leg of said circuit and a high gain differential amplifier whose output is connected to the input of said bridge circuit and whose input is connected to the output of said bridge circuit so that a large negative feedback is achieved, said transducer being adapted to provide a voltage which is directly proportional to the ratio of a function of absolute temperature without temperature compensation to the selected variable and at least one of said components being adapted to compensate for said temperature function so that said voltage is proportional to the ratio of only a selected positive power of absolute temperature to said selected variable.

5. A transducer as stated in claim 1 wherein said positive power of absolute temperature is $T^n$ where $n$ is greater than or equal to 0.1 and less than or equal to 2.

6. A transducer adapted to provide a voltage which is accurately and directly proportional to the volume of a given mass of gas comprising the following components:
    (a) at least two bodies of semiconductor material, (I) the first of said bodies being subjected to a first strain corresponding to said gas pressure and being subjected to said gas temperature, and (II) the second of said bodies being subjected to a second substantially different strain corresponding to said gas pressure and being subjected to said gas temperature;
    (b) a carrier structure supporting said bodies adapted to translate the effect of said gas pressure into strain on said bodies; and
    (c) an electrical circuit including a bridge circuit having each of said bodies connected in a leg of said circuit, a high gain differential amplifier whose output is connected to the input of said bridge circuit and whose input is connected to output of said bridge circuit so that a large negative feedback is achieved, and a voltage source connected between the output of said bridge circuit and the input of said differential amplifier, said transducer being adapted to provide a voltage which is directly proportional to said gas volume and a function of absolute temperature without temperature compensation and at least one of said components being adapted to compensate for said temperature function so that said voltage is directly proportional to said gas volume.

No references cited.

LOUIS R. PRINCE, *Primary Examiner.*

DONALD O. WOODIEL, *Assistant Examiner.*